United States Patent
Chen

(10) Patent No.: US 12,386,012 B2
(45) Date of Patent: Aug. 12, 2025

(54) POSITIONING APPARATUS AND METHOD BASED ON ULTRA WIDE BAND, AND DEVICE AND STORAGE MEDIUM

(71) Applicants: ZHEJIANG GEELY HOLDING GROUP CO., LTD., Zhejiang (CN); NINGBO GEELY AUTOMOBILE RESEARCH AND DEVELOPMENT CO., LTD., Zhejiang (CN)

(72) Inventor: Guoan Chen, Zhejiang (CN)

(73) Assignees: ZHEJIANG GEELY HOLDING GROUP CO., LTD., Zhejiang (CN); NINGBO GEELY AUTOMOBILE RESEARCH AND DEVELOPMENT CO., LTD., Zhejiang (CN)

( * ) Notice: Subject to any disclaimer, the term of this patent is extended or adjusted under 35 U.S.C. 154(b) by 355 days.

(21) Appl. No.: 18/308,652

(22) Filed: Apr. 27, 2023

(65) Prior Publication Data

US 2023/0341499 A1    Oct. 26, 2023

Related U.S. Application Data

(63) Continuation of application No. PCT/CN2020/124607, filed on Oct. 29, 2020.

(51) Int. Cl.
*G01S 5/02* (2010.01)
(52) U.S. Cl.
CPC ..................... *G01S 5/02* (2013.01)
(58) Field of Classification Search
CPC .......................................................... G01S 5/02
See application file for complete search history.

(56) References Cited

U.S. PATENT DOCUMENTS

| | | |
|---|---|---|
| 2003/0058971 A1 | 3/2003 | Langford et al. |
| 2009/0012768 A1 | 1/2009 | Son et al. |

(Continued)

FOREIGN PATENT DOCUMENTS

| | | |
|---|---|---|
| CN | 103811877 A | 5/2014 |
| CN | 107635283 A | 1/2018 |

(Continued)

OTHER PUBLICATIONS

European Patent Office, Office Action Issued in Application No. 20959099.1, Mar. 11, 2024, Germany, 6 pages.

(Continued)

*Primary Examiner* — Curtis B Odom
(74) *Attorney, Agent, or Firm* — McCoy Russell LLP

(57) ABSTRACT

The present disclosure relates to an UWB-based positioning apparatus and method, a device and a storage medium. The positioning apparatus includes a position determining module, and at least two UWB modules connected to the position determining module, where each of the UWB modules includes a UWB RF unit, a power divider and multiple anchor antennas; the power divider is configured to divide a RF signal radiated from the UWB RF unit to the multiple anchor antennas; multiple anchor antennas are configured to radiate the divided RF signal to a target object and acquire UWB RF signal information of the target object, where the UWB RF signal information include a received signal strength indicator and a radio wave TOF between the target object and each of the multiple anchor antennas; the position determining module is configured to determine position information of the target object based on the UWB RF signal information.

7 Claims, 6 Drawing Sheets

(56) References Cited

U.S. PATENT DOCUMENTS

| | | |
|---|---|---|
| 2010/0195699 A1 | 8/2010 | Liu |
| 2013/0154836 A1 | 6/2013 | Derrico et al. |
| 2016/0259033 A1 | 9/2016 | Madimirov et al. |
| 2020/0041603 A1 | 2/2020 | Stephens et al. |
| 2020/0209340 A1 | 7/2020 | Ylamurto et al. |
| 2020/0228943 A1* | 7/2020 | Martin ............... A63B 24/0062 |

FOREIGN PATENT DOCUMENTS

| | | |
|---|---|---|
| CN | 107664761 A | 2/2018 |
| CN | 108594171 A | 9/2018 |
| CN | 110768681 A | 2/2020 |
| CN | 110911821 A | 3/2020 |
| JP | 2017223645 A | 12/2017 |
| KR | 20200049269 A | 5/2020 |
| WO | 0171850 A1 | 9/2001 |

OTHER PUBLICATIONS

Korean Intellectual Property Office, Office Action Issued in Application No. 10-2023-7017485, Feb. 18, 2025, 15 pages. (Submitted with Machine Translation).

State Intellectual Property Office of the People's Republic of China, Office Action and Search Report Issued in Application No. 202080107788.X, Aug. 27, 2024, 14 pages. (Submitted with Machine Translation).

European Patent Office, Office Action Issued in Application No. 20959099.1, Sep. 6, 2024, Germany, 4 pages.

Lagunas, E. et al., "Joint TOA and DOA estimation compliant with IEEE 802.15.4a Standard," Proceedings of the IEEE 5th International Symposium on Wireless Pervasive Computing 2010, May 5, 2010, Modena, Italy, 6 pages.

Navarro, M. et al., "Frequency Domain Joint TOA and DOA Estimation in IR-UWB," IEEE Transactions on Wireless Communications, vol. 10, No. 10, Oct. 1, 2011, 11 pages.

Sedlacek, P. et al., "An Overview of the IEEE 802.15.4z Standard and its Comparison and to the Existing UWB standards," Proceedings of the 2019 29th International Conference Radioelektronika, Apr. 16, 2019, Pardubice, Czech Republic, 6 pages.

European Patent Office, Extended European Search Report Issued in Application No. 20959099.1, Aug. 10, 2023, Germany, 13 pages.

ISA State Intellectual Property Office of the People's Republic of China, International Search Report Issued in Application No. PCT/CN2020/124607, Aug. 2, 2021, WIPO, 4 pages.

ISA State Intellectual Property Office of the People's Republic of China, Written Opinion of the International Searching Authority Issued in Application No. PCT/CN2020/124607, Aug. 2, 2021, WIPO, 6 pages. (Submitted with Machine/ Partial Translation).

* cited by examiner (a)            (b)

POSITIONING APPARATUS AND METHOD BASED ON ULTRA WIDE BAND, AND DEVICE AND STORAGE MEDIUM

CROSS REFERENCE TO RELATED APPLICATIONS

The present disclosure is a continuation of International Application No. PCT/CN2020/124607, filed on Oct. 29, 2020, all of which is incorporated herein by reference in its entirety.

TECHNICAL FIELD

The present disclosure relates to the field of radio communication technology, and in particular, to an Ultra Wide Band-based positioning apparatus and method, a device and a storage medium.

BACKGROUND

Ultra Wide Band (UWB) technology is a new type of radio communication and positioning technology. Data is modulated directly on impulses with very short rise and fall edge over time, so the bandwidth of signals is of GHz level. UWB can be applied in many fields, such as personal area networks, intelligent transportation systems, wireless sensor networks, Radio Frequency identification, and imaging applications.

Unlike most wireless technologies, UWB operates through impulse radio, and its signal peak is steep and narrow, making it easy to recognize even in noisy channel. Therefore, UWB can meet current various needs of short range wireless communication, and is especially applicable for precise positioning in dense multi-path environments.

Applications in Vehicle area of UWB positioning mainly include vehicle locking/unlocking, vehicle automatic start, passenger detection inside vehicle, onboard drone operation, automatic valet parking, automatic parking, parking lot entry control, drive-in payment, etc. A basic principle of vehicle UWB positioning is to install several UWB positioning apparatuses, also known as anchor stations, on a vehicle body. Conventionally, each anchor station is composed of one UWB module and one anchor antenna integrated therewith. Usually, the anchor antenna is an onboard antenna, and is assembled with other components of the UWB module on a circuit board, then their assembly is packaged together with a plastic shell to form a complete anchor station. The cost of the UWB module is a main composition part of the anchor station cost.

In order to meet the requirements of positioning outside and inside a vehicle, generally, the larger the number of anchor stations is, the more accurate the positioning will be. However, for anchor stations with a conventional architecture, UWB modules with the same number of anchor antennas need to be installed, which is expensive.

Therefore, there is a need to provide an improved UWB-based positioning apparatus to reduce production and usage costs.

SUMMARY

In the embodiments of the present disclosure, an UWB-based positioning apparatus and method, a device and a storage medium are provided, so as to reduce the production and usage costs of the UWB-based positioning apparatus.

According to an aspect, in an embodiment of the present disclosure, a UWB-based positioning apparatus, including: a position determining module, and at least two UWB modules connected to the position determining module, where, each of the UWB modules includes a UWB RF unit, a power divider and multiple anchor antennas; an input end of the power divider is connected to the UWB RF unit, and output ends of the power divider are connected to the multiple anchor antennas individually; where the multiple anchor antennas include a first anchor antenna and a second anchor antenna; a length of a cable between the first anchor antenna and the power divider is a first electrical length, and a length of a cable between the second anchor antenna and the power divider is a second electrical length; a difference between the first electrical length and the second electrical length is greater than a spatial distance between the first anchor antenna and the second anchor antenna; an overlap rate value between signal coverage areas of any two of the multiple anchor antennas is a predetermined overlap value;

the power divider is configured to divide a UWB RF signal radiated from the UWB RF unit to the multiple anchor antennas;

the multiple anchor antennas are configured to radiate the divided UWB RF signals to the air, receive a UWB RF signal from a target object, and extract UWB RF signal information of the target object by utilizing the divided UWB RF signals, where, the UWB RF signal information includes a received signal strength indicator and a radio wave time of flight between the target object and each of the multiple anchor antennas; and the position determining module is configured to determine position information of the target object based on the UWB RF signal information.

In an embodiment, the UWB RF unit is further configured to identify First Path signal information from the UWB RF signal information, acquire a received signal strength indicator of a First Path signal and a radio wave time of flight of the First Path signal, and determine an anchor antenna corresponding to the First Path signal.

According to another aspect, in an embodiment of the present disclosure, a UWB-based positioning method is provided, including:

in response to being in a search state or receiving a UWB RF signal from a target object, generating at least two UWB RF signals through at least two UWB modules, where each of the UWB modules includes a UWB RF unit, a power divider and multiple anchor antennas; an input end of the power divider is connected to the UWB RF unit, and output ends of the power divider are connected to the multiple anchor antennas individually; where the multiple anchor antennas include a first anchor antenna and a second anchor antenna; a length of a cable between the first anchor antenna and the power divider is a first electrical length, and a length of a cable between the second anchor antenna and the power divider is a second electrical length; a difference between the first electrical length and the second electrical length is greater than a spatial distance between the first anchor antenna and the second anchor antenna; an overlap rate value between signal coverage areas of any two of the multiple anchor antennas is a predetermined overlap value;

dividing, by the power divider, a UWB signal radiated from the UWB RF unit to the multiple anchor antennas, and radiating the divided UWB RF signals to the air through the multiple anchor antennas;

in response to extracting UWB RF signal information of the target object by utilizing the divided UWB RF signals, determining position information of the target object based on the UWB RF signal information, where the UWB RF signal information includes a received signal strength indicator and a radio wave time of flight between the target object and each of the multiple anchor antennas.

In an embodiment, determining the position information of the target object based on the UWB RF signal information includes: determining a current estimated area of the target object based on the received signal strength indicator and the radio wave time of flight between the target object and each of the multiple anchor antennas; acquiring a corresponding relationship table between target areas and optimal anchor antenna groups; determining an optimal anchor antenna group corresponding to the current estimation area from the corresponding relationship table; determining received signal strength indicators and radio wave times of flight between anchor antennas in the optimal anchor antenna group and the target object, and updating the UWB RF signal information; and determining the position information of the target object based on the updated UWB RF signal information.

In an embodiment, after updating the UWB RF signal information, and before determining the position information of the target object based on the updated UWB RF signal information, the method further includes: re-determining the current estimation area of the target object based on the received signal strength indicator and the radio wave time of flight between each of the multiple anchor antennas and the target object acquired multiple times; and in response to that the current estimation area is changed, repeating the following operations including: determining an optimal anchor antenna group corresponding to the current estimation area from the corresponding relationship table; determining received signal strength indicators and the radio wave times of flight between anchor antennas in the optimal anchor antenna group and the target object, and updating the UWB RF signal information.

In an embodiment, determining the received signal strength indicators and the radio wave times of flight between the anchor antennas in the optimal anchor antenna group and the target object includes: generating precise positioning UWB RF signals through UWB RF units corresponding to the optimal anchor antenna group; dividing the precise positioning signals to multiple anchor antennas corresponding to the optimal anchor antenna group, and radiating the divided precise positioning UWB RF signals through the multiple anchor antennas; and based on acquired feedback information extracted from the divided precise positioning UWB RF signal of the target object, determining the received signal strength indicators and the radio wave times of flight between the multiple anchor antennas in the optimal anchor antenna group and the target object.

In an embodiment, determining the position information of the target object based on the UWB RF signal information includes: identifying First Path signal information from the UWB RF signal information, and acquiring a received signal strength indicator and a radio wave time of flight of a First Path signal; and determining the position information of the target object based on the received signal strength indicator and the radio wave time of flight of the First Path signal.

The UWB-based positioning apparatus and method, the device and the storage medium in the embodiments of the present disclosure have the following advantageous effect:

The UWB-based positioning apparatus in the present disclosure includes a position determining module, and at least two UWB modules connected to the position determining module, where each of the UWB modules includes a UWB RF unit, a power divider and multiple anchor antennas; an input end of the power divider is connected to the UWB RF unit, and output ends of the power divider are connected to the multiple anchor antennas individually; an overlap rate value between signal coverage areas of any two of the multiple anchor antennas is a predetermined overlap value; the power divider is configured to divide a UWB RF signal radiated from the UWB RF unit to the multiple anchor antennas; the multiple anchor antennas are configured to radiate the divided UWB RF signal to a target object and acquire UWB RF signal information of the target object, where the UWB RF signal information include a received signal strength indicator and a radio wave TOF between the target object and each of the multiple anchor antennas; the position determining module is configured to determine position information of the target object based on the UWB RF signal information. According to the UWB-based positioning apparatus in the present disclosure, the utilization rate of the UWB modules in an anchor station can be improved. Compared with the anchor station structure including one module and one anchor antenna in the existing technology, according to the present disclosure, the number of UWB modules can be reduced under the condition of the same number of anchor antennas, and thereby production costs and usage costs can be significantly reduced. Alternatively, a larger number of effective anchor antennas can be provided under the condition of the same cost, and thereby positioning accuracy can be improved.

BRIEF DESCRIPTION OF THE DRAWINGS

In order to illustrate the technical solutions in the embodiments of the present disclosure more clearly, the accompanying drawings required for description of the embodiments will be briefly introduced below. Apparently, the drawings in the following description are only some examples of the present disclosure. For those of ordinary skill in the art, other drawings can be obtained from these drawings without creative efforts.

DETAILED DESCRIPTION OF THE EMBODIMENTS

The technical solutions in the embodiments of the present disclosure will be clearly and completely described below with reference to the accompanying drawings therein. Apparently, the described embodiments are only some but not all of the embodiments of the present disclosure. Based on the embodiments of the present disclosure, all other embodiments obtained by those of ordinary skill in the art without creative efforts shall fall within the protection scope of the present disclosure.

It should be noted that terms "first", "second" and the like in the specification, claims and drawings of the present disclosure are used to distinguish similar objects, instead of describing a specific order or an order of priority. It should be understood that data used in this way can be interchanged in appropriate cases, so that the embodiments of the present disclosure described here can be implemented in an order other than those illustrated or described here. In addition, terms "including", "having" and any variation thereof are intended to cover non-exclusive inclusion. For example, Processes, methods, systems, products or servers including a series of steps or units are not necessarily limited to those clearly listed steps or units, but can include unclearly listed steps or units, or other steps or units inherent in these processes, methods, products or devices.

Figure 1:
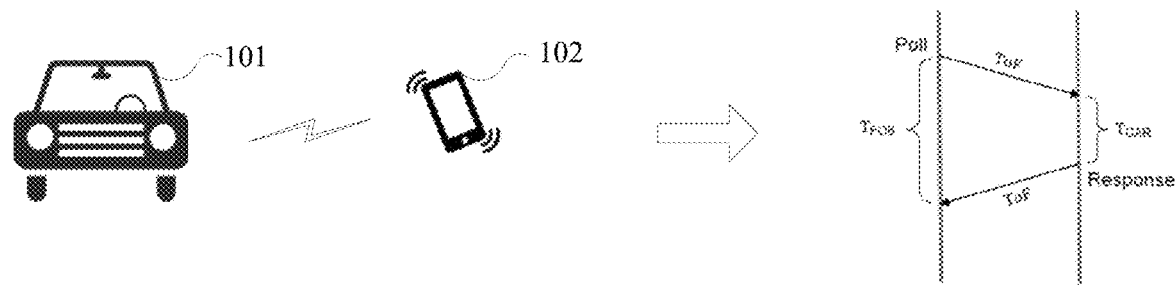
FIG. 1 is a schematic diagram illustrating an application scenario according to an embodiment of the present disclosure.

The embodiments of the present disclosure are introduced in conjunction with a typical application scenario, which may be a vehicle area positioning scenario, specifically, for example, a vehicle unlocking scenario. As shown in FIG. 1, a vehicle 101 and a tag 102 are included. The vehicle 101 is installed with Ultra Wide Band (UWB) positioning apparatuses (also known as anchor stations), and the tag 102 (a tag refers to a mobile device with UWB, for example, a digital key Fob or a mobile phone). In this scenario, the vehicle 101 needs to acquire the position of the tag 102 to be unlocked.

A basic working principle of UWB radio distance measuring is introduced with reference to FIG. 1. As shown on a right side of FIG. 1, the tag 102 radiates a UWB short pulse through an antenna. An anchor station installed on the vehicle 101 receives the UWB short pulse through an antenna, and after a fixed or controllable time delay $T_{CAR}$, radiates a response pulse to the tag 102 through the antenna (while radiating the time delay $T_{CAR}$ between a time at which the anchor station received the UWB short pulse and a time at which the anchor station radiates the response pulse to the tag). After receiving the response pulse and the time delay $T_{CAR}$ from the anchor station on the vehicle 101, the tag 102 calculates a radio wave Time of Flight (ToF) between the tag 102 and an anchor point on the vehicle 101 based on a time delay $T_{FOB}$ between a time at which the tag 102 radiated the UWB short pulse and a time at which the tag 102 receives the response pulse: $ToF=(T_{FOB}-T_{CAR})/2$, and a distance D between the tag 102 and the vehicle 101: $D=ToF*C$, where C represents a velocity of light.

It should be noted that the first inquiry UWB short pulse radiated by the tag 102 may be radiated by the vehicle 101, and the response pulse is radiated by the tag 102, with the same distance measuring principle. In addition, when ToF distance measuring between the tag and an anchor antenna is conducted, UWB signal transmission is quickly switched in both receiving and radiating directions in a Time Division Duplexing (TDD) mode, and hereinafter, is usually expressed only in one direction for simplicity and convenience of expression, for example, the tag radiates and the anchor station receives or the anchor station radiates and the tag receives, but their working principle supports signal transmission in the other direction.

Figure 2:
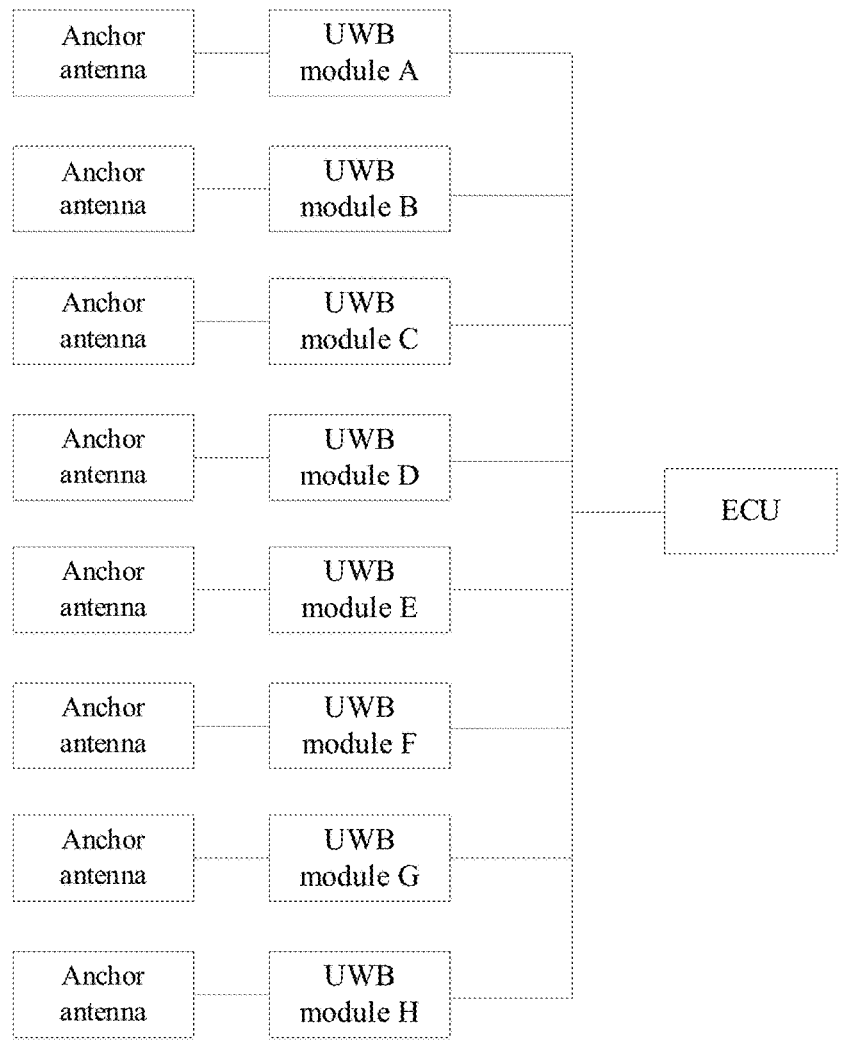
FIG. 2 is a schematic diagram illustrating an arrangement of anchor stations on a vehicle body in the existing technology according to an embodiment of the present disclosure.
Figure 3:
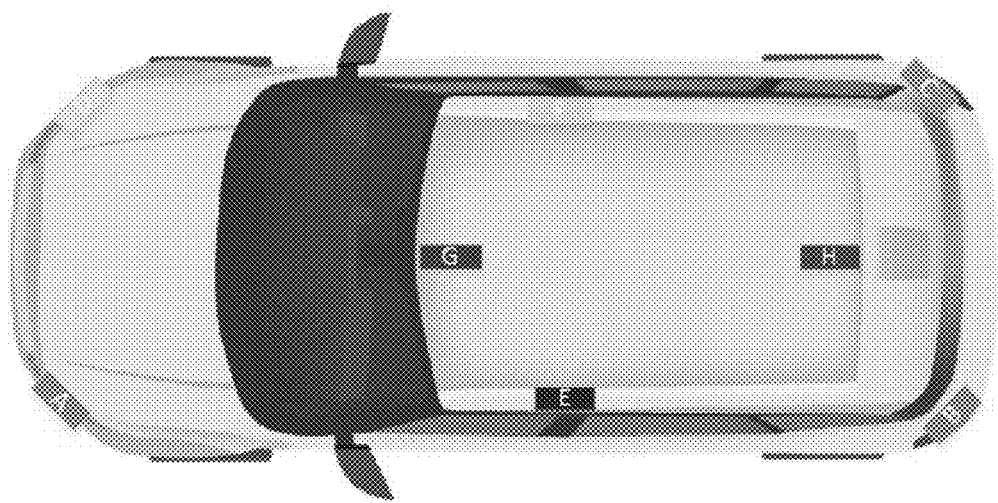
FIG. 3 is a schematic diagram illustrating a structure of an anchor station in the existing technology according to an embodiment of the present disclosure.

According to the introduction of background technology, a conventional anchor station is composed of one UWB module and one anchor antenna, and the position of the anchor antenna on a vehicle body is accurately calibrated. FIGS. 2 and 3 show examples of an eight-module and eight-anchor point arrangement in which each UWB module is equipped with a single anchor antenna in an existing technology according to the embodiments of the present disclosure. Based on the conventional structure in which the single module is equipped with the single anchor antenna, a UWB-based positioning method in the existing technology mainly involves radiating, by an Electronic Control Unit (ECU) on a vehicle, a control instruction to an anchor station through a CAN bus, and executing, by the anchor station, a distance measuring/communication protocol between the anchor station and a tag to acquire a ToF distance between the tag and each anchor point, then executing, by the ECU, a positioning algorithm to calculate a position of the tag relative to a vehicle body coordinate system.

On one hand, for the positioning algorithm, in order to successfully calculate a two-dimensional coordinate position of the tag relative to the vehicle body coordinate system (this two-dimensional coordinate system is usually parallel to the ground and a height of the two-dimensional coordinate system relative to the ground takes a fixed value), ToF distances from at least two valid anchor points to the tag need to be input; in order to successfully calculate a three-dimensional coordinate position of the tag relative to the vehicle body coordinate system, ToF distances from at least three valid anchor points to the tag need to be input. Generally, if ToF distances from more valid anchor points to the tag can be input, the accuracy of tag position output from the positioning algorithm will be higher.

On the other hand, since a working frequency of UWB positioning is 3.1 GHz~10.5 GHz, and a band width is 500 MHz or above, a power spectral density is not greater than −41.3 dBm/MHz. In this frequency band, radio wave propagation substantially has a straight-line propagation characteristic. Since the vehicle body has special-shaped metal surfaces formed by press-welding metal plates, when there is no Line of Sight (LOS) condition between an anchor antenna and a tag antenna, the main energy for emitting antenna radio waves is blocked by the surfaces of the vehicle body or reflected to other directions so as not to reach a receiving antenna. A small amount of energy may be diffusely reflected/diffracted from the ground and surrounding objects to indirectly reach the receiving antenna, but these signals that indirectly reach the receiving antenna do not propagate along straight lines, so that their flight paths are greater than direct paths. When the tag is outside the vehicle, due to the uncertainty of propagation environments for external radio wave at different parking places, as well as the blockage on radio wave propagation caused by the movement of human/objects around the vehicle body and changes in reflection/diffraction surfaces, ToF lengths of the radio waves between the anchor point/tag transmitting and receiving antennas along the non-direct paths have no stable correlation with a linear physical distance between the anchor point/tag transmitting and receiving antennas in three-dimensional space (ignoring blockages), and cannot be used as effective information for tag positioning. When the tag is inside the vehicle, due to the relatively closed electromagnetic environment formed by a metal shell of the vehicle body, the multi-path propagation feature between an anchor point installed at a fixed position in the vehicle and a tag located at a specific position in the vehicle has certain stability. Therefore, in addition to the direct paths, the non-direct paths can provide certain effective positioning information. In order to achieve higher positioning accuracy outside the vehicle, the LOS condition should be satisfied between the tag and the anchor station. In order to have 2-3 anchor points that meet the LOS conditions at any position within a certain range around the vehicle body, simulation and actual measurement indicate that the number of anchor stations outside the vehicle is at least four or more. In order to acquire an identification ability with certain accuracy for the interior space area of the vehicle where the tag is located (driver/front passenger/back seat areas, etc.), and acquire an identification ability with certain precision for determining whether the tag is inside/outside the vehicle when the tag is located near a vehicle window, the number of anchor stations inside the vehicle is at least three or more.

Based on the two different considerations mentioned above, the more anchor stations the vehicle is equipped with, the more accurate the positioning will be. However, currently, each anchor station is composed of one UWB module and one anchor antenna (at this time, the number of anchor stations is the same as the number of anchor antennas), and the cost of UWB modules is a main composition part of the anchor station cost. As the number of anchor stations is increased, their cost is increased proportionally, which puts great pressure on the cost control of vehicle types equipped with UWB positioning function. Some mid-level and low-level vehicle types have to reduce the number of anchor stations installed thereon in order to reduce the cost. However, due to the insufficient number of anchor stations, the tag outside the vehicle can have the LOS conditions for 2-3 anchor points only within a certain area, and in other areas, the other areas are not provided with the minimum number of anchor points with the LOS conditions, resulting in the tag being unable to locate or positioning accuracy being too low. Due to the insufficient number of anchor stations, too low positioning accuracy for the tag within an area inside the vehicle makes it impossible to accurately identify the seat area where the tag is located, and when the tag is located near the vehicle window, whether its location is inside or outside the vehicle, the identifiable range is smaller and the accuracy is too low. As a result, application functions based on UWB positioning capability cannot be realized or their indicators do not meet the requirements, ultimately affecting the user experience.

Figure 4:
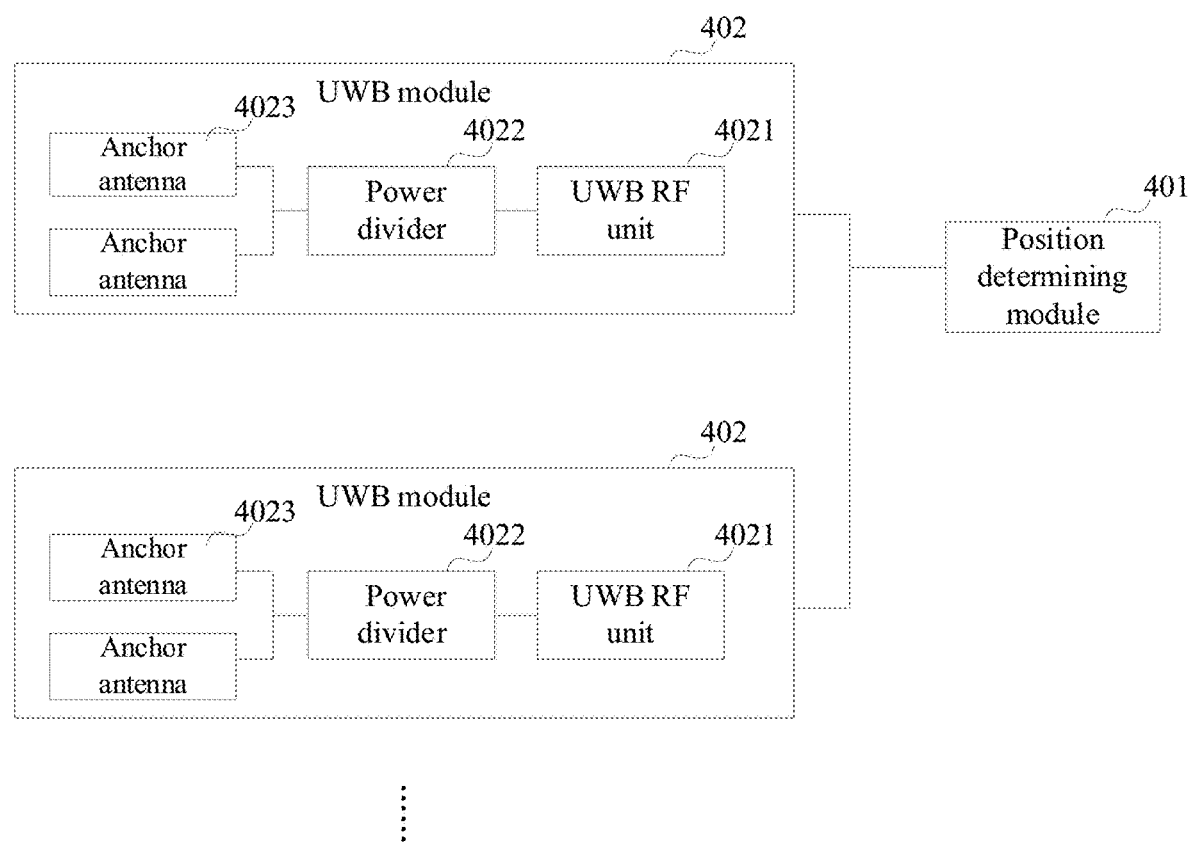
FIG. 4 is a schematic diagram illustrating a structure of a UWB-based positioning apparatus according to an embodiment of the present disclosure.

Based on the problems in the existing technology, in the embodiments of the present disclosure, a UWB-based positioning apparatus is provided. Referring to FIG. 4, which is a structural schematic diagram illustrating a UWB-based positioning apparatus according to an embodiment of the present disclosure, a position determining module 401 and at least two UWB modules 402 connected to the position determining module 401 are included. The position determining module 401 is implemented through a processor. In an embodiment, when the UWB module 402 is installed on a vehicle, the position determining module 401 can be implemented through an onboard processor.

Each of the UWB modules 402 includes a UWB Radio Frequency (RF) unit 4021, a power divider 4022 and multiple anchor antennas 4023. An input end of the power divider 4022 is connected to the UWB RF unit 4021, and output ends of the power divider 4022 are connected to the multiple anchor antennas 4023 individually. An overlap rate value between signal coverage areas of any two of the multiple anchor antennas 4023 is a predetermined overlap value.

The power divider 4022 is configured to divide a UWB RF signal radiated from the UWB RF unit 4021 to the multiple anchor antennas 4023.

The multiple anchor antennas 4023 are configured to radiate the divided UWB RF signal to a target object and acquire UWB RF signal information of the target object, where the UWB RF signal information include a received signal strength indicator (RSSI) and a radio wave TOF between the target object and each of the multiple anchor antennas 4023.

The position determining module 401 is configured to determine position information of the target object based on the UWB RF signal information.

In the embodiments of the present disclosure, when the target object in a search area is positioned, the target object here refers to a tag. For each UWB module 402, the UWB RF signal of the UWB RF unit 4021 can be divided to the multiple anchor antennas 4023 through the power divider 4022, and the divided UWB RF signal is radiated to the target object through the multiple anchor antennas 4023; the overlap rate value between the signal coverage areas of any two of the multiple anchor antennas 4023 is the predetermined overlap value (for example, when the predetermined overlap value is 0, it is indicated that the signal coverage areas of any two anchor antennas 4023 do not overlap); due to being in a search state, the position of the target object in the search area is uncertain, and the power divider 4022 divides an output power of the UWB RF signal of the UWB RF unit 4021 to each anchor antenna 4023 according to the number of the multiple anchor antennas 4023. It should be noted that signal coverage areas of all anchor antennas 4023 from different UWB modules 402 can include the search area. Next, a response signal of the target object in the search area can be received through the multiple anchor antennas 4023. According to the response signal and the UWB RF signal, the radio wave TOF between each anchor antenna 4023 and the target object can be determined, and the received signal strength indicator of the response signal corresponding to each anchor antenna 4023 can be determined. The radio wave TOF and the received signal strength indicator between each anchor antenna 4023 and the target object are referred to as the UWB RF signal information. If the received signal strength indicator corresponding to an anchor antenna 4023 in a UWB module 402 is strongest and/or the radio wave TOF corresponding thereto is shortest, the physical distance between the anchor antenna 4023 and the target object is shortest or the environment for radio wave transmission is best (with the least blockages). Further, the position determining module 401 can determine the position information of the target object through a positioning algorithm according to the UWB RF signal information.

In the embodiments of the present disclosure, the UWB-based positioning apparatus can be applied to a process of positioning the target object in the search area, in addition to a process of searching for a device installed with the positioning apparatus for the target object. A UWB module of the target object radiates a scanning signal. If the device equipped with the positioning apparatus in the present disclosure is within a scanning range of the target object, the device will receive the scanning signal through the positioning apparatus. At this time, each UWB module 402 in the positioning apparatus will generate a corresponding UWB RF signal. The UWB RF signal is divided to corresponding multiple anchor antennas 4023 by a corresponding power divider 4022, and the divided UWB RF signal is radiated through the multiple anchor antennas to respond to the target object. Finally, the positioning apparatus acquires the UWB RF signal information from the target object, and then calculates the position information of the target object through the position determining module 401.

In an optional implementation, the power divider 4022 may be any one of a two-way power divider, a three-way power divider, a four-way power divider and other multi-way power dividers. Due to the fact that the power divider 4022 is usually a passive component made from a Printed Circuit Board (PCB), the reliability of the positioning apparatus can be improved. For convenience, hereinafter, the two-way power divider which can divide one power into two powers will be taken mainly as an example. Cases of using the multi-way power dividers such as the three-way power divider and the four-way power divider, due to having the same principle as the case of using the two-way power divider, still fall within the protection scope of the present disclosure.

The positioning apparatus according to the embodiments of the present disclosure can be applied to the vehicle area positioning application scenario previously described, and solve the technical problems in the existing technology. In the present disclosure, the manner in which one existing UWB module is fixedly equipped with one anchor antenna can be changed into a manner in which for one UWB module (UWB RF unit 4021), a power divided to two or more anchor antennas 4023 through the power divider 4022. In this way, the utilization rate of the UWB modules in an anchor station can be improved. Compared with the anchor station structure including one module and one anchor antenna in the existing technology, according to the present disclosure, the number of UWB modules can be reduced under the condition of the same number of anchor antennas, and thereby production costs and usage costs can be significantly reduced. Alternatively, a larger number of effective anchor antennas can be provided under the condition of the same cost, and thereby positioning accuracy can be improved.

Figure 5:
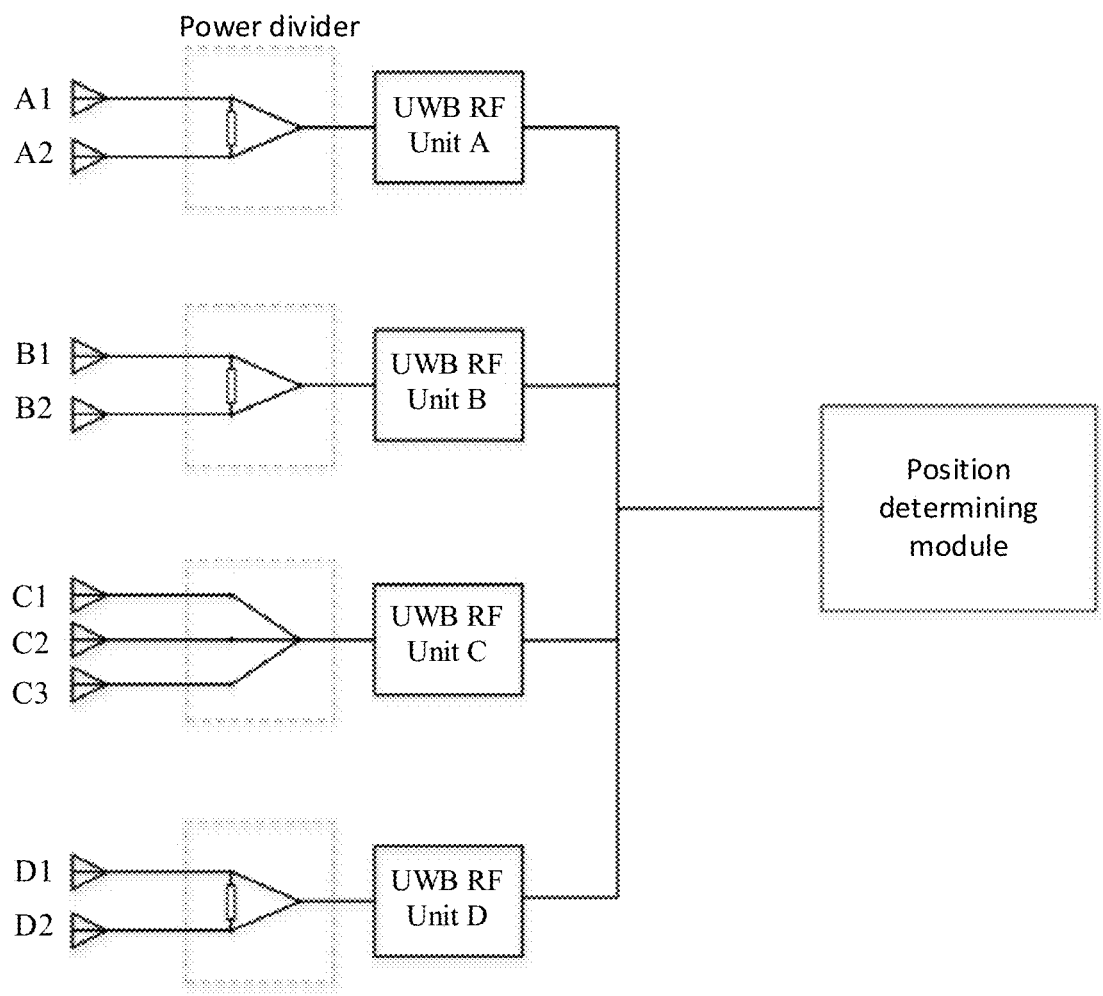
FIG. 5 is a schematic diagram illustrating an architecture of a UWB-based positioning apparatus according to an embodiment of the present disclosure.
Figure 6:
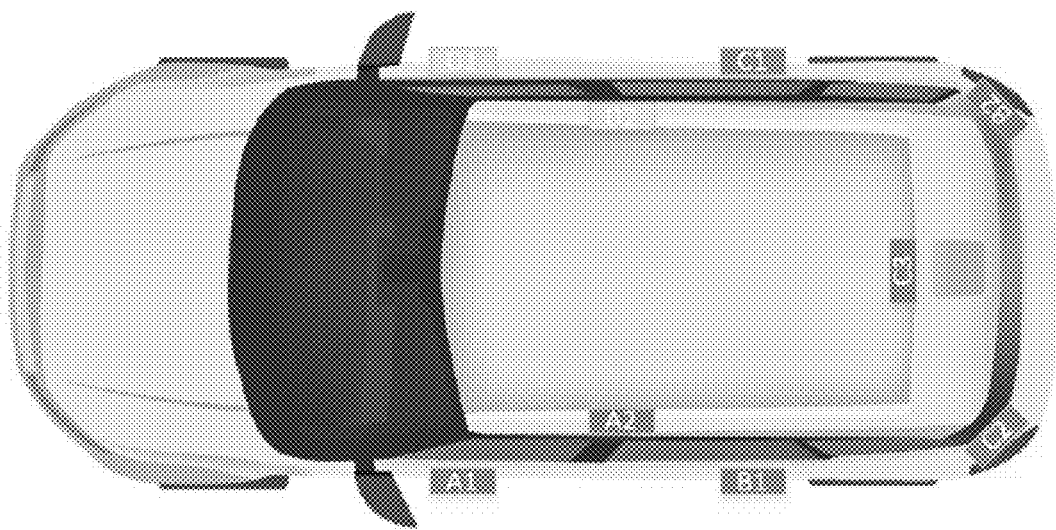
FIG. 6 is a schematic diagram illustrating an arrangement of a positioning apparatus on a vehicle body according to an embodiment of the present disclosure.

In a specific implementation, referring to FIG. 5, which is a schematic diagram illustrating an architecture of a UWB-based positioning apparatus according to an embodiment of the present disclosure, and FIG. 6, which is a schematic diagram illustrating an arrangement of a positioning apparatus on a vehicle body according to an embodiment of the present disclosure, the positioning apparatus in the present disclosure may include four UWB modules A, B, C and D, where the UWB module A includes an anchor antenna A1 located outside a vehicle and an anchor antenna A2 located inside the vehicle; the UWB module B includes anchor antennas B1 and B2 located outside the vehicle; the UWB module C includes anchor antennas C1 and C2 located outside the vehicle and an anchor antenna C3 located inside the vehicle; the UWB module D includes an anchor antenna D1 located outside the vehicle and an anchor antenna D2 located inside the vehicle. Each of the UWB modules includes one UWB RF unit. Power dividers in the UWB modules A, B and D are two-way power dividers, while a power divider in the UWB module C is a three-way power divider.

According to the present disclosure, by comparing an example of a four-module and nine-anchor point arrangement in which two anchor antennas are equipped through the two-way power divider and three anchor antennas are equipped through the three-power divider to an example of an eight-module and eight-anchor point arrangement in which each of UWB modules in current conventional arrangement is equipped with one anchor antenna in FIGS. 2 and 3, although the number of modules in the conventional arrangement is four more than the number of modules in the present disclosure, where the modules refer to UWB RF units, the number of anchor points in the present disclosure is one more than the number of anchor points in the conventional arrangement. Therefore, their differences in positioning range coverage and positioning accuracy are not large, but the number of UWB RF units in the present disclosure is significantly smaller. Due to the fact that the UWB RF units occupy the main cost of the positioning apparatus, when the UWB-based positioning apparatus according to the present disclosure is applied to a vehicle area positioning system, on the premise of ensuring the accuracy, the number of UWB modules can be reduced to significantly reduce the production costs and usage costs, and the number of anchor antennas can be increased to improve the positioning accuracy.

In the embodiments of the present disclosure, when the positioning apparatus is applied to vehicle area positioning, the signal coverage areas of any two of the multiple anchor antennas in the same UWB module should not overlap. For example, in a UWB module, two UWB RF signals can be acquired by splitting through a two-way power divider, where one of the two UWB RF signals is fed to an anchor antenna installed outside the vehicle and the other one of the two UWB RF signals is fed to an anchor antenna installed inside the vehicle. Due to the electromagnetic shielding and isolating effects of the metal vehicle body, one of the two anchor antennas can serve for positioning within a certain area outside the vehicle, and the other one of the two anchor antennas can serve for positioning within an area inside the vehicle. Taking anchor antennas on a vehicle end that radiate signals as an example, although two anchor antennas inside/outside the vehicle simultaneously radiate UWB RF signals from the same UWB RF unit, the tag can be located only in an area outside or inside the vehicle, and will not appear in two non-overlapping areas at the same time. When the tag and the anchor antenna outside the vehicle satisfies LOS conditions, the radio wave TOF between the tag and the anchor antenna outside the vehicle of the UWB module can be acquired. When the tag is located inside the vehicle and has certain LOS conditions with the anchor antenna inside the vehicle of the UWB module (radio waves can pass through a non-metal material in a cabin), the radio wave TOF between the tag and the anchor antenna inside the vehicle can be acquired. Whether the tag is located outside or inside the vehicle, as long as the radio wave TOF between two or more anchor antennas belonging to different UWB modules can be acquired at its location, the tag can be positioned through a positioning algorithm.

Similarly, an UWB RF signal of the same UWB RF unit is split into two UWB RF signals through a power divider, one of which is fed to an anchor antenna outside the vehicle installed on a side of the vehicle body and the other one of which is fed to an anchor antenna outside the vehicle installed on another side of the vehicle body. Due to the blockage of the vehicle body, when the tag is located on a side, the tag can receive a signal only from an anchor antenna located on this side. Therefore, the UWB RF signal of the same UWB RF unit can be used for positioning the tag on different sides.

As shown in FIG. 6, in each of UWB modules A and D, two signals are acquired by splitting through a two-way power divider, and are connected to two anchor antennas through feed lines. One of the two anchor antennas is installed outside the vehicle and the other one of the two anchor antennas is installed inside the vehicle. Anchor points A1/D1 can be installed within skirt plates on lower sides outside the vehicle. Anchor points A2/D2 can be installed within a pillar A or B inside the vehicle, and their heights are lower than lower edges of vehicle windows. Therefore, the anchor points A1 and A2 as well as the anchor points D1 and D2 are separated by metal vehicle doors and the vehicle body, and their coverage areas are divided into two independent areas outside and inside the vehicle. In the UWB module B, two signals are acquired by splitting through a two-way power divider, and are respectively fed to within a skirt plate on a rear left lower side and a cover plate of a bumper on a rear right side outside the vehicle through feed lines. Although both of the two anchor points are located outside the vehicle, due to the blockage of the vehicle body, their coverage areas do not overlap. In the UWB module C, three signals are acquired by splitting through a three-way power divider, where an anchor point C3 is installed within a trunk through a feed line, and anchor points C1/C2 are respectively fed to within a skirt plate on a rear right lower side and a cover plate of a bumper on a rear left side outside the vehicle. Although both of the anchor points C1/C2 are located outside the vehicle, due to the blockage of the vehicle body, their coverage areas do not overlap. The anchor point C3 is located inside the vehicle, and due to the shielding effect of the vehicle body, its coverage area is inside the vehicle, and is separated from the coverage areas of the anchor points C1/C2.

In the embodiments of the present disclosure, the problem of decreases in transmission power and sensitivity caused by power dividers and feed line losses is considered. Due to the use of a power divider to split an UWB RF signal from a UWB module, an output power of each anchor antenna during transmission is decreased, and a receiving noise coefficient of the UWB module converted from the anchor antenna during reception is increased. These are caused by a power distribution ratio of the power divider, an insertion loss of the power divider, and an insertion loss of a feed line. Assuming that, in a case where a power distribution ratio of a two-way power divider is ½, its power loss is 3 dB (because 10*log 2=3 dB), and in a case where a power distribution ratio of a three-way power divider is ⅓, its power loss is 4.77 dB (because 10*log 3=4.77 dB), an insertion loss of the power divider is calculated as 1.5 dB, and an insertion loss of a cable is calculated as 1.8 dB/m (if a maximum length of the cable is 2 m, its insertion loss is 3.6 dB), then a total insertion loss of two-way power dividers is 3 dB+1.5 dB+3.6 dB=8.1 dB, and a total insertion loss of three-power dividers is 4.77 dB+1.5 dB+3.6 dB=9.87 dB. Both of the total insertion losses are lower than 10 dB. For a UWB positioning application on a vehicle end, since a distance between a tag and an anchor point (usually within a distance measuring range of 6 meters) is short, actual measurement indicates that the insertion loss of within 10 dB is fully within a predicted range of RF links. A power reduction of 5-10 dB does not affect the measurement of a ToF value between the tag and the anchor point, and this appropriate power reduction will make an RF receiver in a better linear area. At this time, the ToF accuracy is higher.

Figure 7:
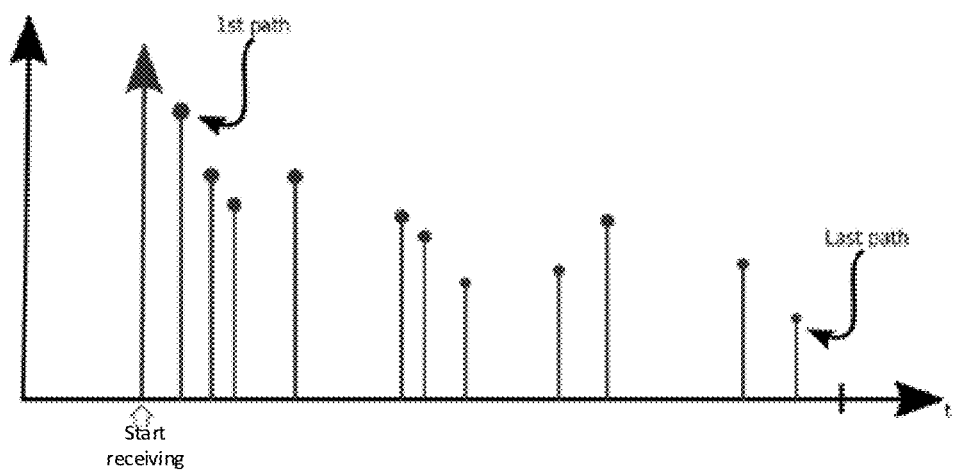
FIG. 7 is a schematic diagram illustrating a receiver that receives multi-path signals according to an embodiment of the present disclosure.

In the embodiments of the present disclosure, the UWB RF signal for positioning is in a form of UWB pulse, with a signal band width of over 500 MHz and a pulse width of about 2 ns. It can be seen that the pulse radiated and received from UWB is very narrow, and thus the UWB receiver has very high multi-path resolution ability. Due to the large radiation angle range of a UWB antenna for vehicle area positioning, which is usually above 120 degrees, after the anchor station or the tag radiates one narrow pulse, except for the direct path, reflectors from different directions and different distances reach the receiver with delays through different path. A typical UWB receiver receives all multi-path signals, as shown in FIG. 7. Black arrows on a vertical axis in FIG. 7 represent emission of a signal, and gray arrows on the vertical axis represent start of receiving a signal. A signal first reaching the receiver is called a First Path signal, and a signal finally reaching the receiver is called a Last Path signal.

Assuming that the UWB receiver can distinguish a minimum time delay between two adjacent paths is half of its pulse width, when the pulse width is 2 ns, a corresponding multi-path distance resolution DeltaR is:

$$\text{DeltaR}=\text{tau}*c=0.5*\text{pulse width}*\text{velocity of light}=0.5*2E^{-9}*3E^{8}=0.3 \text{ m}=30 \text{ cm}$$

When the UWB receiver is working in a distance measuring mode (ToF measurement), only a ToF value and a signal strength of the First Path signal are output, and other multi-path components are ignored.

Therefore, in an optional implementation, the UWB RF unit is further configured to identify a First Path signal from the UWB RF signal information, acquire a received signal strength indicator and a radio wave TOF of the First Path signal, and determine an anchor antenna corresponding to the First Path signal.

In the embodiments of the present disclosure, it is assumed that time delays between individual branch signals output from the power divider and a common port are equal, and cable lengths between individual branch ports of the power divider and corresponding anchor antennas can be different.

In an optional implementation, multiple anchor antennas include a first anchor antenna and a second anchor antenna; a cable connection length between the first anchor antenna and the power divider is a first electrical length, and a cable connection length between the second anchor antenna and the power divider is a second electrical length; a difference between the first electrical length and the second electrical length is greater than a physical distance between the first anchor antenna and the second anchor antenna. A difference between the difference between the first electrical length and the second electrical length, and the physical distance between the first anchor antenna and the second anchor antenna is greater than or equal to a multi-path distance resolution. For the multi-path distance resolution, reference may be made to 30 cm calculated above.

Figure 8:
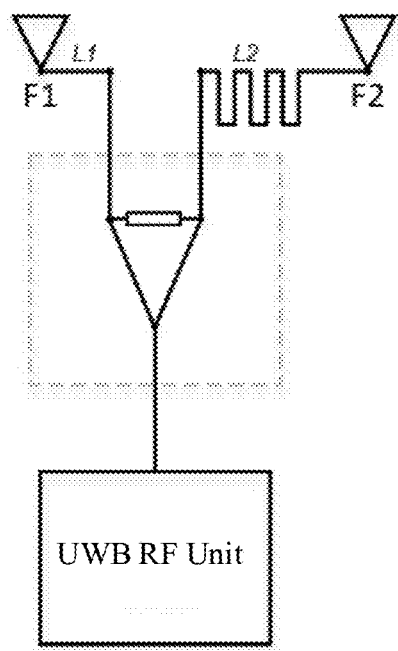
FIG. 8 is a schematic diagram illustrating a two-way power divider that is connected to anchor antennas according to an embodiment of the present disclosure.

Specifically, as shown in FIG. 8, taking the two-way power divider as an example, an electrical length from a port 1 to a first anchor antenna F1 is L1, and an electrical length from a port 2 to an anchor antenna F2 is L2. It should be noted that Ln is an electrical length of an RF cable, instead of a physical length. Due to different dielectric constants of cable media, ratios of electrical lengths to physical lengths are different. Assuming L2>L1, the difference between the first electrical length and the second electrical length DeltaL=L2−L1.

Figure 9:
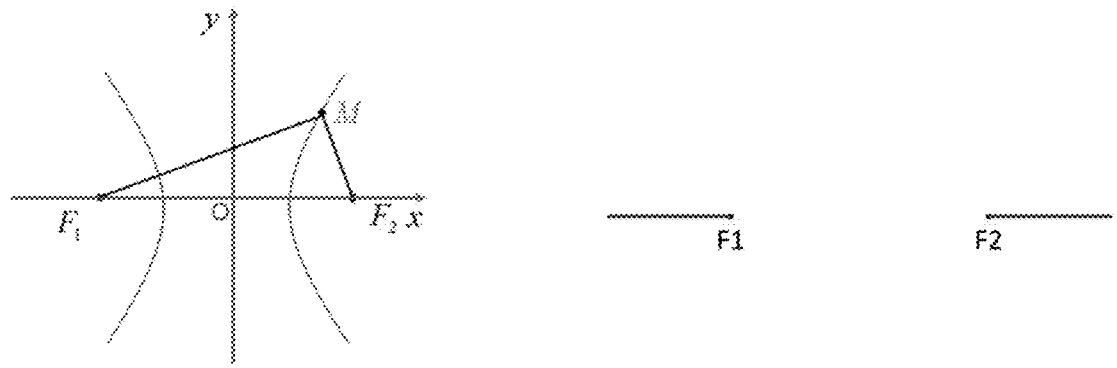
FIG. 9 is a schematic diagram illustrating a function relationship satisfied by a point set according to an embodiment of the present disclosure.

In natural space, a set of points, where for each point of the set of points the absolute difference of the distances to two points is less than the distance between the two points, is a hyperbola on the plane and forms a rotating hyperboloid in space; a set of points, where for each point of the set of points the absolute difference of the absolute difference of the distances to two points is equal to the distance between the two points, is on the extension line of the two points (including the two points); and a set of points, where for each point of the set of points the absolute difference of the absolute difference of the distances to two points is greater than the distance between the two points, is an empty set. Assuming a distance of two anchor points F1 and F2 that is 2c, and any point M in space, where the three points M/F1/F2 determine a plane, for convenience, discussion will be conducted on the (M, F1, F2) plane. A distance from M to F1 is d1, a distance from M to F2 is d2, and a difference between distances of M to two points F1 and F2 is constant |d2−d1|=2a. FIG. 9 (*a*) shows that, when a<c, the set of points is a hyperbola. FIG. 9 (*b*) shows that, when a=c, the set of points is an external extension line (including a focal point) of a connection line of F1 and F2; when a>c, the set of points is an empty set.

Assuming that the point M is a tag, signals emitted therefrom reach the anchor antenna F1 and the anchor antenna F2 respectively through air paths d1 and d2, and then reach the port 1 and the port 2 of the power divider respectively through the cables L1 and L2. After combination by the power divider, the signals from the two paths ultimately enter the receiver respectively as Path 1 and Path 2. M is any point in space, and a maximum difference between distances of M to the anchor points F1 and F2 is 2c. If deltaL−2c>deltaR, where deltaR represents a multi-path distance resolution of UWB, then there is no such P in space, so that M_Path1 is not the First Path. That is, even if there is no blockage between M and F1/F2, due to the First Path selection mechanism of the UWB receiver, a signal emitted from the anchor point F2 is completely hided by a signal emitted from F1 during UWB distance measuring. It should be noted that the hiding here does not refer to the hiding of signal strength, but refers to that an arrival time of a signal received through the anchor point F2 at the receiver is always later than an arrival time of a signal received through the anchor point F1 at the receiver by more than tau, where tau=deltaR/velocity of light. The UWB receiver is based on that the one who reaches first is the First Path, and follows the principle of using only the First Path as the basis for ToF calculation. In this way, the signal Path 2 received through the anchor point F2 will never be selected. That is, even if the strength of a UWB signal received through the anchor point F2 is higher than that received through the anchor point F1, it will not interfere with ToF1 and the positioning accuracy acquired when F1 is used as a positioning anchor point. As long as the strength of the Path 1 signal received through F1 exceeds a detection threshold of the receiver, the Path 1 is the First Path. Only when, in an area between the receiver and F1 which is blocked severely, the signal received through the anchor point F1 enters the receiver and then the strength of the signal is detected to be lower than the detection threshold of the receiver, Path1 cannot be exposed and thus is invisible. At this time, the signal Path 2 received through the anchor point F2 is visible, and the Path 2 becomes the First Path, and at this case, the acquired ToF is ToF2. F2 should be used as the positioning anchor during positioning.

Based on the above characteristics, when anchor points are deployed, F1 is deployed outside the vehicle and F2 is deployed inside the cabin. In this way, even if a signal inside the vehicle overflows near the vehicle window outside the vehicle, as long as the signal of the anchor point F1 outside the vehicle exceeds the threshold of the receiver, the positioning accuracy outside the vehicle will not be affected. The anchor points B1/B2 provide positioning services for rear left and right sides outside the vehicle. When the tag is located in a rear left corner area of the vehicle body, signals radiated from the same UWB RF unit will be simultaneously received at the anchor points B1/B2. If the UWB RF unit is placed together with the anchor antenna B1 (a cable length is approximately equal to zero), and the anchor point B2 is connected to the UWB RF unit through a cable, due to the flexibility of the cable and the effect of cable media, its electrical length is greater than its actual physical length. In a case where the electrical length of the cable between B1 and B2 is greater than a physical distance between B1 and B2 by more than 0.3 m, even if B1 and B2 both satisfy LOS conditions in some areas at the same time, the signal of B2 will not affect the role of B1 as a positioning anchor point.

As shown in FIG. 6, in a rear left area of the vehicle body, the tag can see both B1 and B2. The signals of the anchor points B1 and B2 are acquired by splitting from the same UWB RF unit, but the UWB RF unit is placed together with the anchor point B1. Due to the effect of cable length, when both the signals of the anchor points B1/B2 can reach the tag, B1 is the First Path. Therefore, the signal from the anchor point B1 is used as the positioning signal. When the positioning algorithm is performed, space coordinates of B1 should be used as an anchor station position.

When the tag is located at the rear of the vehicle, only B2 in the module B is visible, while B1 is invisible and its signal is below a threshold. At this time, for the module B, the signal from the anchor antenna B2 is used for positioning the tag. When the positioning algorithm is performed, space coordinates of B2 should be used as an anchor station position.

For the module C, the anchor point C3 is located within the trunk and is separated from the outside. The anchor points outside the vehicle include C1 located on a right side and C2 located at the rear of the vehicle. At a rear right side of the vehicle, signals of both the anchor points C1 and C2 can be received simultaneously. Similar to the situation of B1/B2, the signal of C2 does not work since it is not a First Path signal. Only when the tag is located at the rear of the vehicle, after C1 is blocked and C2 becomes the First Path, C2 can play a positioning role.

Figure 10:
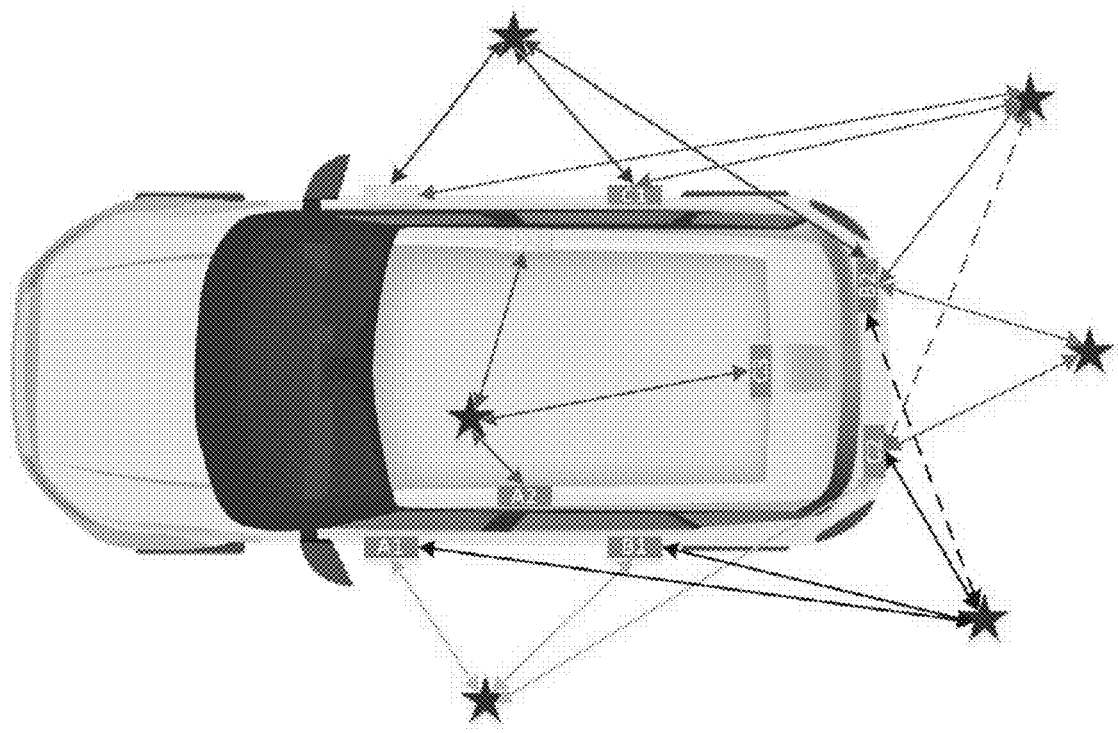
FIG. 10 is a schematic diagram illustrating optimal anchor antenna groups corresponding to a tag in different areas according to an embodiment of the present disclosure.

As shown in FIG. 10, for each UWB module, due to power distribution, the UWB RF signal is transmitted to at least two different and mutually separated radiation areas through cables, and each UWB module can work in at least two different areas. For example, the module A works when the tag is located on a left side of the vehicle or inside the vehicle; the module B works when the tag is located on a left side of the vehicle or at the rear of the vehicle; the module C works when the tag is located on a left side of the vehicle, within the trunk, or at the rear of the vehicle; the module D works when the tag is located on a right side of the vehicle or at the rear of the vehicle. The four modules A/B/C/D are reused at least twice, improving the utilization rate, reducing the total number of modules in the system, and significantly reducing the cost. If a conventional method of integrating each module with each onboard antenna is adopted, in order to achieve the effect of the same positioning and coverage, at least seven anchor stations are needed, where in each of the anchor stations, a module is integrated with an anchor antenna, which will make the cost much higher.

In summary, the present disclosure provides a UWB-based positioning apparatus that by utilizing the shielding and isolating effects of the metal vehicle body on electromagnetic waves, as well as the high-resolution separation ability of the UWB module (UWB RF unit) for the First Path and other path of the received signal, divides the UWB RF signal of the UWB module through the power divider, and thereafter, feeds the divided UWB RF signals to multiple anchor antennas with optimized layout (for example, two or more anchor antennas located individually inside/outside the vehicle or on different sides such as left/right/front/rear sides outside the vehicle), so that one UWB RF unit can be used for both positioning outside and inside the vehicle (including identification of a main driver area/non-main driver area, etc. inside the vehicle, as well as identification of window accessories inside/outside the vehicle).

Based on the contents of the apparatus embodiments, in the embodiments of the present disclosure, a UWB-based positioning method is provided, which can achieve the positioning of a tag outside/inside a vehicle. The specific embodiments of the UWB-based positioning method in the present disclosure will be illustrated below still based on the vehicle area positioning scenario.

Figure 11:
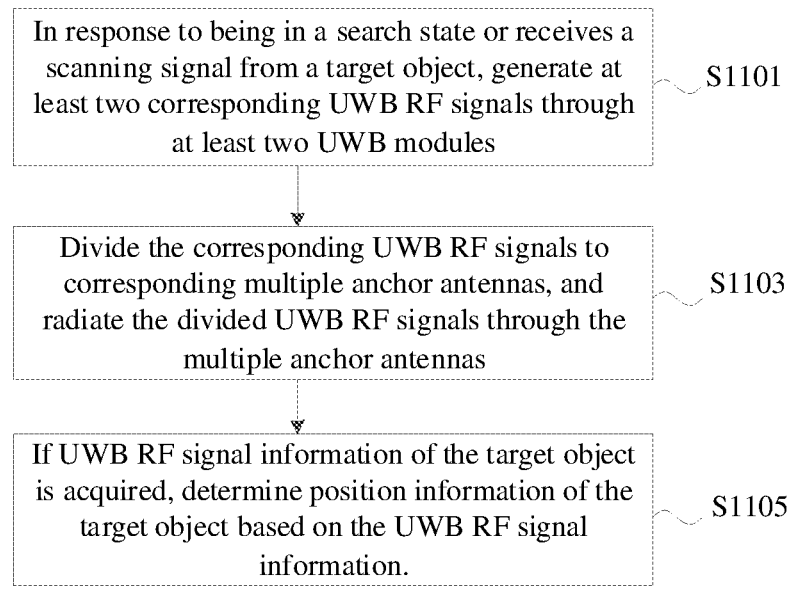
FIG. 11 is a schematic flowchart illustrating a UWB-based positioning method according to an embodiment of the present disclosure.

FIG. 11 is a schematic flowchart illustrating a UWB-based positioning method according to an embodiment of the present disclosure. The specification provides method operation steps, for example, in the embodiments or flowcharts, but based on conventions or without creative efforts, more or fewer operation steps may be included. The sequence of steps listed in the embodiments is only one of many step execution sequences and does not represent a unique execution sequence. In actual system or server product execution, it can be executed sequentially or in parallel according to a method shown in the embodiments or drawings (such as parallel processors or multithread processing environments). Specifically, as shown in FIG. 11, the method may include:

At S1101, in response to being in a search state or receiving a scanning signal from a target object, at least two corresponding UWB RF signals are generated through at least two UWB modules.

In the embodiments of the present disclosure, the vehicle is installed with a UWB-based positioning apparatus introduced in the apparatus embodiments. The positioning apparatus includes at least two UWB modules. Each of the UWB modules includes a UWB RF unit, a power divider and multiple anchor antennas. An input end of the power divider is connected to the UWB RF unit, and output ends of the power divider are connected to the multiple anchor antennas individually. An overlap rate value between signal coverage areas of any two of the multiple anchor antennas is a predetermined overlap value. The at least two corresponding UWB RF signals are generated by UWB RF units.

In the embodiments of the present disclosure, being in the search state refers to a process of the vehicle positioning the target object in a search area; receiving the scanning signal from the target object refers to a process of the target object searching for a device installed with the positioning apparatus. Since the vehicle is just within a search range of the target object, when the scanning signal from the target object is received, at least two corresponding UWB RF signals are generated through at least two UWB modules.

At S1103, the corresponding UWB RF signals are divided to corresponding multiple anchor antennas, and the divided UWB RF signals are radiated through the multiple anchor antennas.

In the embodiments of the present disclosure, the UWB RF signal are divided to corresponding multiple anchor antennas through the power divider and the divided UWB RF signals are radiated through the multiple anchor antennas.

In an optional implementation, a digital attenuator can be added to each branch of the power divider of each UWB module to change the weight of each branch, and its advantage is that, if the scanning signal of the target object is received, since the receiving side is installed with the positioning apparatus, all anchor antennas that receive the scanning signal can be determined, and even an anchor antenna with maximum received signal strength indicator can be determined. Therefore, power distribution weights of individual branches of the power dividers with their original fixed power distribution ratios in different UWB modules can be dynamically adjusted. That is, different weight coefficients are set for different anchor antennas. For example, larger power distribution weights are set for all anchor antennas that receive the scanning signal or for branches of power dividers corresponding to anchor antennas with a received signal strength indicator exceeding a threshold in all anchor antennas that receive the scanning signal, while smaller power distribution weights are set for branches of power dividers corresponding to anchor antennas that do not receive the scanning signal. In this way, the target object can calculate a received signal strength indicator and a radio wave TOF, that is, UWB RF signal information of the target object, between the target object and each anchor antenna more well-directedly, effectively, and accurately according to the received UWB RF signals.

At S1105, if UWB RF signal information of the target object is acquired, position information of the target object is determined based on the UWB RF signal information.

In the embodiments of the present disclosure, the UWB RF signal information includes the received signal strength indicator and the radio wave TOF between the target object and each of multiple anchor antennas. If the UWB RF signal information of the target object is acquired, the position information of the target object is determined through a position determining module in the positioning apparatus according to the positioning algorithm.

In the embodiments of the present disclosure, considering the positioning for the target object (such as the tag), at least two or more anchor points are needed to have good LOS conditions with the tag. Only anchor points that have the LOS conditions have a stable signal ToF and received signal strength indicator, and the tag position acquired for positioning is more accurate and stable. When the tag and anchor points installed on the vehicle body have LOS conditions, if signals that pass through these anchor points have the First Path characteristic, the signals are selected into a positioning anchor point group. Generally, the vehicle body has a good shielding and isolating effect, and the strength of signals of anchor points inside the vehicle when reaching the tag outside the vehicle is usually lower than a detection threshold; vice versa. Even if the strength of the signals from the anchor points inside the vehicle that overflow from the inside of the vehicle and reach the tag outside the vehicle exceeds a threshold of a receiver, as long as the signals are not the First Path signals in a module where they belong, the signals still are picked out by a First Path selection mechanism of a UWB receiver, which will not affect the positioning function; vice versa.

In an optional implementation, determining the position information of the target object based on the UWB RF signal information includes: identifying a First Path signal from the UWB RF signal information, and acquiring a received signal strength indicator and a radio wave TOF of the First Path signal; and determining the position information of the target object based on the received signal strength indicator and the radio wave TOF of the First Path signal.

In an optional implementation, determining the position information of the target object based on the UWB RF signal information, including: determining a current estimation area of the target object based on the received signal strength indicator and the radio wave TOF between the target object and each of the multiple anchor antennas; acquiring a corresponding relationship table between target areas and optimal anchor antenna groups; determining an optimal anchor antenna group corresponding to the current estimation area from the corresponding relationship table; determining received signal strength indicators and radio wave TOFs between anchor antennas in the optimal anchor antenna group and the target object, and updating the UWB RF signal information; determining the position information of the target object based on the updated UWB RF signal information. The corresponding relationship table between the target areas and the optimal anchor antenna groups refers to that, for a specific vehicle type, after an installation position of each anchor antenna on the vehicle body is determined, a corresponding relationship table between the target areas and the optimal anchor antenna groups can be created. The corresponding relationship table between the target areas and the optimal anchor antenna groups provides an optimal anchor antenna group corresponding to any position point inside or outside the vehicle. During positioning, ToF and received signal strength indicator (RSSI) values between the tag and each anchor point in the optimal anchor antenna group can be directly used for positioning.

In a specific implementation, creating the corresponding relationship table between the target areas and the optimal anchor antenna groups includes: after determining arrangement positions of anchor stations (mainly anchor antennas) at the specific vehicle type, first establishing a coordinate grid around the vehicle body on an open field, for example, an equidistant grid with a side length of 10 cm, or designing a non-equidistant grid in a segment manner according to a distance range away from the vehicle body. For each grid position, according to a geometric relationship between a grid point position where the tag is located and each anchor point, and a vehicle body blockage situation, LOS conditions between the tag at the grid point position and each anchor antenna are determined, and an optimal anchor antenna group pattern for the tag at the grid point position is formed, then in combination with the measurement and statistical analysis of UWB anchor point signals, effective ToF and signal amplitude intervals of each grid point position are recorded; when the tag is located in different positions (different grids), the optimal anchor antenna group pattern will change correspondingly, so that using the optimal anchor antenna for positioning can achieve the most accurate positioning effect; a target area in the corresponding relationship table between the target areas and the optimal anchor antenna groups can refer to an area formed by each grid or an area formed by multiple grids, and an optimal anchor antenna group therein can refer to at least two optimal anchor antennas corresponding to a grid or multiple optimal anchor antennas corresponding to multiple grids. As shown in FIG. 10, the optimal anchor antenna groups at corresponding positions inside the vehicle are (A2, C3, D2). Parts outside the vehicle will be more complex, especially, in a transition area between rear left and rear right sides of the vehicle. The determination of optimal positioning anchor point groups needs to be implemented by combining the geometric analysis of vehicle body structure with ToF data collection and statistical analysis.

In a specific implementation, the current estimation area of the target object is determined based on the acquired received signal strength indicator and the radio wave TOF between the target object and each of the multiple anchor antennas. That is, the tag and each module are subjected to a round of distance measuring operation, namely, all anchor points are continuously scanned n times, and outlier elimination and averaging processing are performed to reduce the impact of random interference. The current estimation area can include one or more grids, which correspond to multiple optimal anchor antennas according to the corresponding relationship table. By looking up the table, received signal strength indicators and radio wave TOFs between multiple optimal anchor antennas and the target object can be acquired, and the UWB RF signal information are updated. Finally, the position information of the target object is determined based on the updated UWB RF signal information. It should be noted that, in this implementation, what are acquired by looking up the table are the received signal strength indicators and the radio wave TOFs under ideal conditions (ignoring blockages). The advantage of using pre-stored UWB RF signal information for positioning is that the calculation time can be saved to improve the efficiency and timeliness of positioning.

In an optional implementation, after the received signal strength indicators and the radio wave TOFs between multiple optimal anchor antennas and the target object are acquired by looking up the table, and before the UWB RF signal information is updated, signal characteristics of (ToF, RSSI) of respective anchor antennas in the optimal anchor antenna group are continuously confirmed m times. That is, confirmation signals are radiated to the tag multiple times to re-acquire corresponding (ToF, RSSI) and determine whether to match the signal characteristics of (ToF, RSSI) in the corresponding relationship table. In this way, accurate UWB RF signal information can be acquired.

In an optional implementation, determining the received signal strength indicators and the radio wave TOFs between the anchor antennas in the optimal anchor antenna group and the target object includes: generating precise positioning signals through UWB RF units corresponding to the optimal anchor antenna group; dividing the precise positioning signals to multiple anchor antennas corresponding to the optimal anchor antenna group, and radiating the divided precise positioning signals through the multiple anchor antennas; based on acquired feedback information of the target object, determining the received signal strength indicators and the radio wave TOFs between the anchor antennas in the optimal anchor antenna group and the target object. That is, in this implementation, the manner of directly acquiring (ToF, RSSI) corresponding to the optimal anchor antenna groups by looking up the table is not adopted, but the precise positioning signals are regenerated, and the regenerated precise positioning signals are radiated through multiple anchor antennas. The advantage is that, considering current environment factors, the anchor antennas in the original optimal anchor antenna group may not have the LOS conditions, and (ToF, RSSI) corresponding thereto are naturally no longer accurate. Therefore, the precise positioning signals are re-indicated to the anchor antennas in the optimal anchor antenna group to acquire (ToF, RSSI) in a current environment. In this way, more accurate position information of the target object can be acquired.

In an optional implementation, after updating the UWB RF signal information, and before determining the position information of the target object based on the updated UWB RF signal information, the method further includes: according to the received signal strength indicator and the radio wave TOF between each of multiple anchor antennas and the target object acquired multiple times, re-determining the current estimation area of the target object; if the current estimation area is changed, repeating the steps: determining an optimal anchor antenna group corresponding to the current estimation area from the corresponding relationship table; determining the received signal strength indicators and the radio wave TOFs between the anchor antennas in the optimal anchor antenna group and the target object, and updating the UWB RF signal information.

Specifically, the tag is locked and tracked. After the tracking state is on, data of (ToF, RSSI) of each anchor antenna in the optional anchor antenna group in this area can be used to accurately position the tag, and track and filter its trajectory. After the current estimation area of the tag is determined, the tag continuously radiates signals to all anchor antennas at the same time, and the vehicle acquires the received signal strength indicator and the radio wave TOF between each anchor antenna and the tag multiple times, and re-determines the current estimation area of the target object according to the received signal strength indicator and the radio wave TOF between each of multiple anchor antennas and the target object acquired multiple times, so as to track the tag. If the current estimation area is changed, that is, when an edge of the current estimation area is reached, (ToF, RSSI) values of anchor points in adjacent areas need to be read, and area switching is conducted in combination with the trajectory position of the tag. Since not all anchor point signals are switched simultaneously at the edge of the area, but only some anchor points are switched, and anchor point updates are conducted gradually in stages by increasing or decreasing anchor points one by one, therefore the switching has good continuity. Tracking trajectory and filtering are of a protection mechanism, which may not lose lock due to few position jumps. If the target object is continuously lost K times within a preset area range, it is indicated that the target object is indeed lost, and the search state is re-entered.

In an optional implementation, if the current estimation area is changed, there is a situation where signals of two anchor points of a UWB module jump in an anchor point transition area because, at this time, the original First Path anchor point signal sometimes disappears and sometimes reappears due to its amplitude being less than a threshold, and corresponding another anchor point signal sometimes becomes the First Path signal and sometimes is invisible. If areas where the signals of the two anchor points are located on a two-dimensional plane of (ToF, RSSI) are far away from each other (optimized system design usually meets this condition), in the area where the signals of the anchor points alternately appear, it can be determined which anchor point a signal received by the tag is from, and after determination, it can be further determined which anchor antenna of the UWB module the signal is radiated from, so as to be used for positioning. Therefore, for the sake of safety, a positioning result will be checked and verified through a trajectory filtering algorithm, and if it significantly exceeds a reasonable position range, it will be discarded.

It should be noted that, for any space area inside and outside the vehicle body, as long as 2N-dimensional hyperspace composed of (ToF, RSSI) of First Path signals of all anchor points in the optimal anchor antenna group is unique (where N is a number of anchor points in a positioning optimal anchor point group), individual areas are distinguishable, and parameters (ToF, RSSI) of N anchor points are further used in each area for precise positioning. If a "distance" between 2N-dimensional hyperspace corresponding to three-dimensional space areas inside and outside the vehicle body is longer, the positioning performance of the system will be better.

To sum up, in the present disclosure, utilizing the shielding and isolating effects of the vehicle body and the ToF First Path isolating effect, a UWB-based positioning method is provided, which can increase the coverage area range of each UWB module, improve the utilization rate of the UWB module, reduce the number of UWB modules for meeting function/performance requirements of the entire vehicle, and decrease the cost of the entire UWB positioning system on a vehicle end. In addition, the power dividers/feed lines are passive components with high reliability, long life service and wide temperature range. Although certain cost may be incurred, in a case of calculating based on typical device prices in market and satisfying the condition of the same coverage/positioning accuracy, the cost advantage of solutions in the present disclosure is significant. Compared to the existing technology, at the same cost, in the present disclosure, more effective anchor points can be provided, a range of areas where the tag can be positioned is wider, the positioning accuracy is higher, and the user experience is better.

The apparatus and method embodiments in the present disclosure are based on the same application concept.

Figure 12:
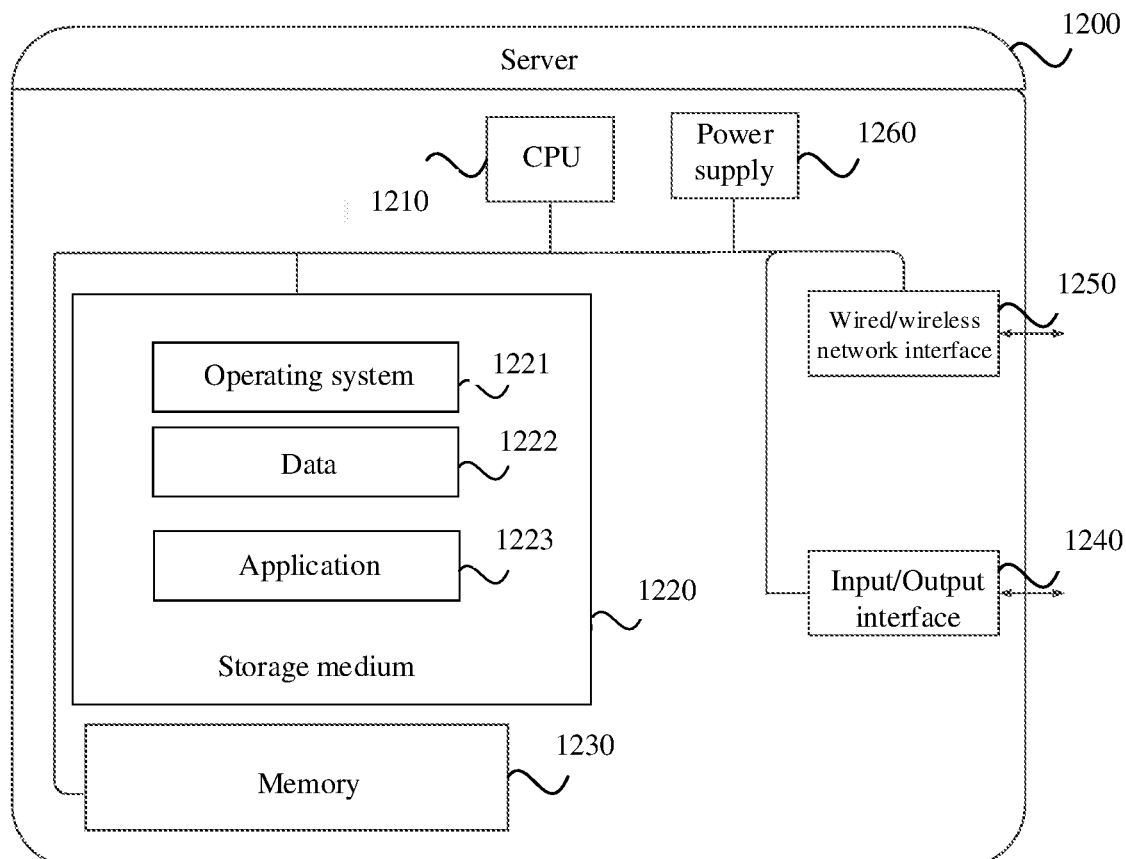
FIG. 12 is a block diagram illustrating a hardware structure of a server of a UWB-based positioning method according to an embodiment of the present disclosure.

The method embodiments in the present disclosure can be executed in a computer terminals, servers, or similar computing apparatuses. Taking the operation on a server as an example, FIG. 12 is a block diagram illustrating a hardware structure of a server of a UWB-based positioning method according to an embodiment of the present disclosure. As shown in FIG. 12, the server 1200 may vary greatly due to different configurations or performances, and include one or more Central Processing Units (CPUs) 1210 (which may include, but is not limited to, processing devices such as Microprocessor Units (MCUs) or Field Programmable Gate Array FPGAs), a memory 1230 for storing data, one or more storage media 1220 (for example, one or more mass storage devices) of storing an application 1223 or data 1222. The memory 1230 and the storage media 1220 may be temporary storage or persistent storage. The program stored in the storage media 1220 may include one or more modules, and each module may include a series of instruction operations on the server. Further, the central processing unit 1210 may be configured to communicate with the storage media 1220 to perform a series of instruction operations in the storage media 1220 on the server 1200. The server 1200 may further include one or more power supplies 1260, one or more wired or wireless network interfaces 1250, one or more input/output interfaces 1240, and/or, one or more operating systems 1221, such as Windows, Mac OS, Unix, Linux and FreeBSD.

The input/output interfaces 1240 can be used to receive or radiate data through a network. A specific example of the network may include a wireless network provided by a communication provider of the server 1200. In an example, the input/output interfaces 1240 include a Network Interface Controller (NIC) that can be connected to other network devices through a base station so as to communicate with the Internet. In an example, the input/output interfaces 1240 can be RF modules configured to communication with the Internet in a wireless manner.

Those of ordinary skill in the art can understand that the structure shown in FIG. 12 is merely illustrative, and does not limit the structure of the electronic device. For example, the server 1200 may further include more or fewer components than those shown in FIG. 12, or have a different configuration from that shown in FIG. 12.

In an embodiment of the present disclosure, a storage medium is provided. The storage medium can be disposed in a server to store at least one instruction, at least one program, a code set or an instruction set related to implementing the UWB-based positioning method in the method embodiments. The at least one instruction, the at least one program, the code set or the instruction set is loaded and executed by a processor to implement the UWB-based positioning method.

Optionally, in the embodiments, the storage medium can be located on at least one of multiple network servers in a computer network. Optionally, in the embodiments, the storage medium may include, but is not limited to, U disk, Read-Only Memory (ROM), Random Access Memory (RAM), mobile hard disk, magnetic disk, optical disc or other medium that can store program codes.

As can be known from the embodiments of the UWB-based positioning apparatus and method, the device and the storage medium in the present disclosure, according to the present disclosure, the utilization rate of the UWB modules in an anchor station can be improved. Compared with the anchor station structure including one module and one anchor antenna in the existing technology, according to the present disclosure, the number of UWB modules can be reduced under the condition of the same number of anchor antennas, and thereby production costs and usage costs can be significantly reduced. Alternatively, a larger number of effective anchor antennas can be provided under the condition of the same cost, and thereby positioning accuracy can be improved.

It should be noted that the order of priority of the embodiments of the present disclosure is only for description, but does not represent the advantages or disadvantages of the embodiments. The specific embodiments of the present specification are described above. Other embodiments are within the scope of the appended claims. In some cases, actions or steps recorded in the claims can be performed in an order different from that in the embodiments and desired results can still be achieved. In addition, processes depicted in the drawings are not necessarily required to be performed in a shown particular or consecutive order to achieve the desired results. In some embodiments, multi-task processing and parallel processing are possible or may be advantageous.

Various examples in the present specification are described in a progressive manner, and same or similar parts between the embodiments may be referred to each other. Each embodiment focuses on the differences from other embodiments. Especially, for the apparatus embodiments, since the apparatus embodiments are basically similar to the method embodiments, the description is simplified, and reference may be made to some of the description of the method embodiments.

Those of ordinary skill in the art can understand that all or part of the steps to implement the embodiments may be performed by hardware, or by instructing relevant hardware through programs. The programs can be stored in a computer readable storage medium, which may be ROM, magnetic disk, optical disc or the like.

The above described are only preferred embodiments of the present disclosure, which are not intended to limit the application. Any modification, equivalent replacement, improvement, etc. made within the spirit and principle of the present disclosure shall be included in the protection scope of the application.

The invention claimed is:

1. A UWB-based positioning apparatus, comprising: a position determining module, and at least two UWB modules connected to the position determining module, wherein
    each of the UWB modules comprises a UWB RF unit, a power divider and multiple anchor antennas; an input end of the power divider is connected to the UWB RF unit, and output ends of the power divider are connected to the multiple anchor antennas individually; wherein the multiple anchor antennas comprise a first anchor antenna and a second anchor antenna; a length of a cable between the first anchor antenna and the power divider is a first electrical length, and a length of a cable between the second anchor antenna and the power divider is a second electrical length; a difference between the first electrical length and the second electrical length is greater than a spatial distance between the first anchor antenna and the second anchor antenna; an overlap rate value between signal coverage areas of any two of the multiple anchor antennas is a predetermined overlap value;
    the power divider is configured to divide a UWB RF signal radiated from the UWB RF unit to the multiple anchor antennas;
    the multiple anchor antennas are configured to radiate the divided UWB RF signals to the air, receive a UWB RF signal from a target object, and extract UWB RF signal information of the target object by utilizing the divided UWB RF signals, wherein, the UWB RF signal information comprises a received signal strength indicator and a radio wave time of flight between the target object and each of the multiple anchor antennas; and
    the position determining module is configured to determine position information of the target object based on the UWB RF signal information.

2. The apparatus according to claim 1, wherein the UWB RF unit is further configured to identify First Path signal information from the UWB RF signal information, acquire a received signal strength indicator of a First Path signal and a radio wave time of flight of the First Path signal, and determine an anchor antenna corresponding to the First Path signal.

3. A UWB-based positioning method, comprising:
    in response to being in a search state or receiving a UWB RF signal from a target object, generating at least two UWB RF signals through at least two UWB modules, wherein each of the UWB modules comprises a UWB RF unit, a power divider and multiple anchor antennas; an input end of the power divider is connected to the UWB RF unit, and output ends of the power divider are connected to the multiple anchor antennas individually; wherein the multiple anchor antennas comprise a first anchor antenna and a second anchor antenna; a length of a cable between the first anchor antenna and the power divider is a first electrical length, and a length of a cable between the second anchor antenna and the power divider is a second electrical length; a difference between the first electrical length and the second electrical length is greater than a spatial distance between the first anchor antenna and the second anchor antenna; an overlap rate value between signal coverage areas of any two of the multiple anchor antennas is a predetermined overlap value;

dividing, by the power divider, a UWB signal radiated from the UWB RF unit to the multiple anchor antennas, and radiating the divided UWB RF signals to the air through the multiple anchor antennas;

in response to extracting UWB RF signal information of the target object by utilizing the divided UWB RF signals, determining position information of the target object based on the UWB RF signal information, wherein the UWB RF signal information comprises a received signal strength indicator and a radio wave time of flight between the target object and each of the multiple anchor antennas.

4. The method according to claim 3, wherein determining the position information of the target object based on the UWB RF signal information comprises:

determining a current estimated area of the target object based on the received signal strength indicator and the radio wave time of flight between the target object and each of the multiple anchor antennas;

acquiring a corresponding relationship table between target areas and optimal anchor antenna groups;

determining an optimal anchor antenna group corresponding to the current estimation area from the corresponding relationship table;

determining received signal strength indicators and radio wave times of flight between anchor antennas in the optimal anchor antenna group and the target object, and updating the UWB RF signal information; and determining the position information of the target object based on the updated UWB RF signal information.

5. The method according to claim 4, wherein, after updating the UWB RF signal information, and before determining the position information of the target object based on the updated UWB RF signal information, the method further comprises:

re-determining the current estimation area of the target object based on the received signal strength indicator and the radio wave time of flight between each of the multiple anchor antennas and the target object acquired multiple times; and in response to that the current estimation area is changed, repeating the following operations comprising: determining an optimal anchor antenna group corresponding to the current estimation area from the corresponding relationship table; determining received signal strength indicators and the radio wave times of flight between anchor antennas in the optimal anchor antenna group and the target object, and updating the UWB RF signal information.

6. The method according to claim 4, wherein determining the received signal strength indicators and the radio wave times of flight between the anchor antennas in the optimal anchor antenna group and the target object comprises:

generating precise positioning UWB RF signals through UWB RF units corresponding to the optimal anchor antenna group;

dividing the precise positioning signals to multiple anchor antennas corresponding to the optimal anchor antenna group, and radiating the divided precise positioning UWB RF signals through the multiple anchor antennas; and based on acquired feedback information extracted from the divided precise positioning UWB RF signal of the target object, determining the received signal strength indicators and the radio wave times of flight between the multiple anchor antennas in the optimal anchor antenna group and the target object.

7. The method according to claim 3, wherein determining the position information of the target object based on the UWB RF signal information comprises:

identifying First Path signal information from the UWB RF signal information, and acquiring a received signal strength indicator and a radio wave time of flight of a First Path signal; and determining the position information of the target object based on the received signal strength indicator and the radio wave time of flight of the First Path signal.

* * * * *